United States Patent [19]
Green et al.
[11] 3,928,842
[45] Dec. 23, 1975

[54] FINGERPRINT COMPARATOR

[75] Inventors: Harold Green, Los Angeles; Stephen J. Halasz, Claremont, both of Calif.
[73] Assignee: Veriprint Systems Corporation, Chatsworth, Calif.

[22] Filed: May 9, 1974
[21] Appl. No.: 468,425

[52] U.S. Cl.... 340/146.3 Q; 235/181; 340/146.3 E; 356/168
[51] Int. Cl.[2] .......................................... G06K 9/08
[58] Field of Search...... 235/181; 356/71, 165, 167, 356/168; 250/556, 557, 567; 340/146.3 F, 146.3 G, 146.3 E, 146.3 Q

[56] References Cited

UNITED STATES PATENTS

| | | | |
|---|---|---|---|
| 2,989,890 | 6/1961 | Dressler | 340/146.3 Q |
| 3,221,301 | 11/1965 | Moyroud | 340/146.3 G |
| 3,511,571 | 5/1970 | Ogle | 340/146.3 E |
| 3,747,103 | 7/1973 | Gamertsfelder | 250/550 |

*Primary Examiner*—Leo H. Boudreau
*Attorney, Agent, or Firm*—Robert Louis Finkel

[57] ABSTRACT

A method and apparatus for rapid automatic comparison of two patterns, such as fingerprints, each of which may be randomly located and oriented within some bounded area. The patterns, or portions thereof, are optically superimposed and rapidly scanned with respect to each other in a rotated scan pattern. Reflected or transmitted incoherent radiance is sensed to provide a measure of the correlation between the two patterns. Logic circuitry including a threshold decision function signifies pattern identity or dissimilarity by activating a panel light, audible signal or other suitable indicator. Optical baffling and spatial and electronic filtering enhance correlation signal discrimination and supress spurious modulation responses.

15 Claims, 22 Drawing Figures

FINGERPRINT COMPARATOR

BACKGROUND OF THE INVENTION

1. Field of the Invention

This invention relates generally to automatic electro-optical pattern comparators. More particularly, it contemplates a method and apparatus for automatically comparing a pair of fingerprints by superimposing their images, sensing the incoherent radiance reflected by or transmitted through them, and comparing this radiance with a predetermined correlation output threshold.

2. Description of the Prior Art

Fingerprints have been recognized for more than a century as one of the most reliable means of identifying humans and distinguishing them from one another. It takes but a few minutes for a skilled expert with nothing more than a magnifying glass to visually compare a latent print with a known exemplar for similarities among the characteristics that identify every fingerprint as belonging to a particular individual. These characteristics, or "minutiae" are essentially interuptions and aberrations in the normal ridge flow whose whorls, loops and arches determine the well known pattern classifications. Concurrence of as few as a dozen of these ridge branches and endings, islands, spikes and enclosures has been deemed sufficient to establish positive identification.

As long as the comparision had to be done visually and required the services of a trained technician, the use of fingerprints for identification and discrimination was limited almost exclusively to the fields of criminal investigation and law enforcement. It has long been appreciated that if fingerprint identification could be automated, this method of personal identification would lend itself readily to a variety of other purposes, such as access control in intelligence and security situations, transaction monitoring in banking, credit, merchandising and other commercial operations, mass processing in welfare program and health service administration, and many more. Widespread interest has lead to the development of a great number of automated fingerprint comparison systems directed towards serving these purposes. Such a system should be fully automatic, requiring neither technical skill nor judgmental decision-making on the part of the operator, and highly reliable. Preferably, the system should be embodied in a small, compact, self-contained unit which can be relatively inexpensively mass-produced, and which requires little maintenance in the field. None of the systems heretofore developed satisfies all of these requirements.

At present, these systems are of two basic types: those that rely on computerized digital filtering and pattern recognition, and those that use coherent optical correlation, the former being by far the more prevalent of the two.

Both types either "read" a transfer of a print or sense the live print of the person to be identified. The transfer may be reproduced visibly on a medium such as the customary inked fingerprint card, a glass plate, a photographic transparency, or a thermoplastic or chemically etched film, or electromagnetically on a special metal plate or the screen of a cathode-ray tube. The live print is most often sensed by means of an optical system incorporating a reflective prism.

Earlier digital systems utilize a semi-automated procedure whereby an operator enters the fingerprint characteristics into a computer manually, or electronically by means of a CRT-linked probe. Fully automatic digitalizers sense and encode the minutiae and other print characteristics by means of flying spot scanners. A number of algorithms have been developed to enable the computer to match the encoded data from the transfer or live print with similar data taken from an exemplar print, electronically.

To reduce the time required to process the characteristic data, a selection function is generally employed to limit the number of features actually used in making the identification. Some form of image enchancement is normally applied during the image processing steps to eliminate background noise which would otherwise obscure the refined electronic image and produce confusing characteristic data. Likewise, in some of the more sophisticated digital systems electronic processing is employed in an attempt to compensate for linear and radial misalignment, variations in graphic quality, geometric distortion of the print owing to plastic movement of the thumb or finger pad, and similar image imperfections. In spite of all these refinements, none of the prior art devices of the pure digital type has successfully overcome the problems associated with image orientation and indexing, contrast, focus and brightness variation, and imprint distortion.

While digital fingerprint identification systems rely primarily on high-speed optical scanning and data-processing techniques, coherent optical correlation sytems generally utilize holography, Fourier filtering or similar analog techniques. Essentially all of these techniques convert the optical fingerprint images to be compared into two dimensional holographs, Fourier transforms, or analogous transparencies, one of which is allowed to act as a coherent light filter with the other. Print identification is predicated on a comparison of the amplitude of the filtered signal output with a predetermined correlation threshold.

While coherent optical processing effectively eliminates many of the problems associated with lateral image displacement and variations in graphic image quality, it is particularly sensitive to rotational misalignment of the images. Additionally, with the Fourier filter approach vital phase information about the transform is lost, and since many different patterns can have the same amplitude transform, the trade-offs necessary to achieve a satisfactory level of reliability for correct image matching impose an unexceptably high rate of false rejection. Although in a system utilizing true holograms the phase information is retained, the mechanical precision and stability required have heretofore made this approach impracticable outside the laboratory.

A few hybrid systems combining digitalized techniques with coherent optical methods have been tried, but while these have overcome some of the aforementioned problems, their overall performance has been less than satisfactory.

SUMMARY OF THE INVENTION

The subject invention satisfies all of the aforementioned requirements for a rapid, fully automated multipurpose fingerprint comparator and at the same time avoids, or minimizes the effects of the deficiencies inherent in the prior art systems based on digital filtering and pattern recognition and coherent optical correlation methods.

The subject invention is essentially an analog device utilizing incoherent, rather than coherent light. In it the two fingerprints to be compared are placed on opposite ends of an optical system. Either or both of the prints may be opaque or transparent. The first print is illuminated by a bright incoherent light source. A mask or alternative beam-narrowing means defines a limited portion of the illuminated print for transmission through the lens train to the second print. The reduced image is superimposed on or passed through the second print.

A two-axis optical scan mechanism moves this illuminated image across the second print in a raster scan pattern of sufficient line density to assure that if the two prints are identical the correlation location is not missed. To allow for rotational indexing error between the two prints, either the illuminated image of the first print or the second print itself is rotated and the raster scan repeated. A photodetector senses the incoherent radiance reflected by or transmitted through the second print.

The amount of light reflected or transmitted is a function of the location of the illuminated image on the second print. It varies somewhat randomly as the light portions of the image fall on various dark portions of the print, however, at one position, and one position only during the scan of the image across the print the image and print coincide. That is, all of the light portions of the image fall on the light portions of the print, and only dark portions of the image fall on the dark portions of the print. At this unique juxaposition of the image and print, maximum reflection or transmission of light occurs. If desired, the illuminated image of the first print could be made a reversal or negative of the second print, by any of a number of convention means, and in this event the light reflected by or transmitted through the second print would be minimal at the point of juxtaposition.

By way of example, taking a pair of identical positive opaque inked fingerprints, and assuming that the ridges and valleys of the print structure are equal in width, and that the ridges have been printed as black and the valleys between them as white, the overall average reflectance of the second fingerprint is approximately 50 percent. In other words, approximately half of the amount of light from the image falling on the second fingerprint is absorbed by the black portions of the second print, and approximately half is reflected by the white portions. At the point of coincidence of the image and the second print, however, all of the illumination transmitted by the white portions of the image falls on like white portions of the second print, and, therefore, all of the transmitted radiance is reflected and none is absorbed by the black portions of the second print.

The sudden increase in reflected radiance from an average value near 50 percent to nearly 100 percent is the typical correlation signal peak that occurs at the instant of coincidence of the image with a like portion of the identical print. In all other cases, the amplitude of any given signal peak is a measure of the degree of correlation between the image and the portion of the print being scanned.

The subject invention employs both spatial and electronic filtering techniques to eliminate or supress unwanted background noise and spurious signals, to enhance the correlation signal, and to increase the signal to noise ratio.

In the spatial domain, the image narrowing mask or equivalent structure is removed a sufficient distance from one of the foci in the lens train to convolve with the image of the first print. This optical convolution produces an apodizing effect on the image which supresses the spurious correlation peak signals which would otherwise result when the sharp edge of an unapodized image crossed the line structure in the second print.

The line spacing in fingerprints has a characteristic spatial frequency, which results in a unique temporal output signal frequency during the raster scan. The electrical bandwidth following the photodetector output is properly tuned, in the manner of an optimum filter, to enhance the correlation peak signal to noise ratio. This filter supresses low frequency signals that may result from gross features or discontinuities in dissimilar prints, and which could appear over the threshold. It differentiates the signal in the well known manner of lead circuits to enhance the sudden transition of the correlation peak, and it supresses the Gaussian white noise or photon noise of the photodetector.

BRIEF DESCRIPTION OF THE DRAWINGS

The nature of the invention and its advantages will appear more fully from the following detailed description taken in conjunction with the accompanying drawing, in which.

Wherever practicable, the same numeral is used on components which are structurally or functionally alike.

DESCRIPTION OF THE PREFERRED EMBODIMENT

Figure 1:
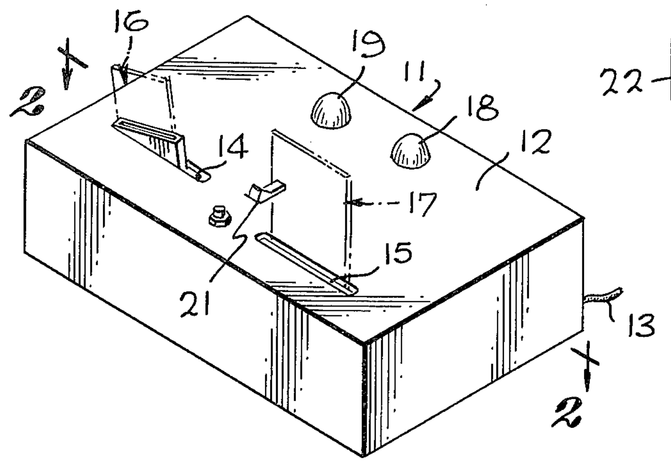
FIG. 1 is a perspective view showing the external appearance of a fingerprint comparator embodying the subject invention for use in a bank or commercial establishment.

Referring to the drawings, FIG. 1 represents a typical transaction monitoring unit such as a check or credit card verifier for use in banks, restaurants or other commercial establishments. In its simplest form, the comparator 11 is enclosed in a casing 12 of metal, plastic, wood or other convenient material. While it may be self-contained and operated by means of internal batteries (not shown), preferably it is connected to a source of house current by means of a conventional cord 13. A pair of slots 14, 15 are provided to receive identification card or credit card 16 and the customer's check, charge slip or other document 17, respectively. Green and red lights 18, 19, respectively, indicate that a positive identification has or has not been established. Spring-loaded rocker switch 21 initiates a scanning cycle each time it is depressed and returns to the "ready" position when the cycle has been completed. The use of an integrated electronic circuit and solid state components eliminates the need for a preheat switch.

Figure 1A:
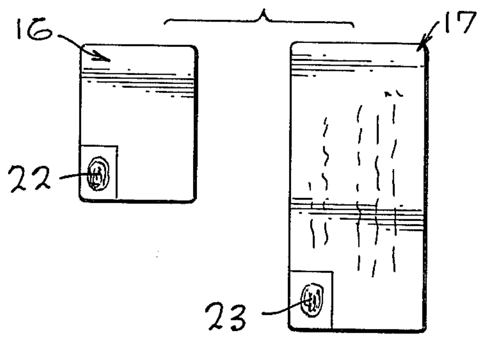
FIG. 1*a* is a composite view showing a typical identification card bearing the owner's fingerprint and a document, such as a check, on which the holder's fingerprint has been imprinted.

As illustrated in FIG. 1*a*, a bank signature card, customer identification card, or credit card 16 bearing the true fingerprint of the bank, establishment or credit card customer, verified at the time of its issuance, serves as an exemplar for the purpose of identification. A fingerprint 23 of the same finger of the customer to be identified is affixed, preferrably under the supervision of a bank or establishment employee, to a blank space on the customer's check or charge slip, or on some other convenient form 17. For illustrative purposes the operation of the comparator 11 of this embodiment will be described as it would be used in a bank as a check verifier, with exemplar 16 a signature card and the document 17 a check.

Although the subject invention provides for considerable tolerance in the indexing and registration of the two prints 22, 23, some care should be taken in positioning and orienting print 23 on the check 17 to minimize the possibility of false rejection. A variety of more or less conventional fingerprinting devices are currently available and will serve adequately for this purpose. Their construction and operation are outside the scope of the subject invention.

The prints 22, 23 may be printed on opaque surfaces or may be made up as transparencies. The subject invention may readily be adapted to utilize either form. Obviously, whichever form is used efforts should be made to achieve the greatest degree of contrast possible between the imprint of the ridges and the grooves, and to minimize smearing and distortion of the print.

While the comparator of the subject invention will operate with fingerprints of practically any color or hue, we have found that the optimum contrast is achieved with black prints on a white background, and that black is useable with a greater variety of backgrounds than any other color.

Figure 2:
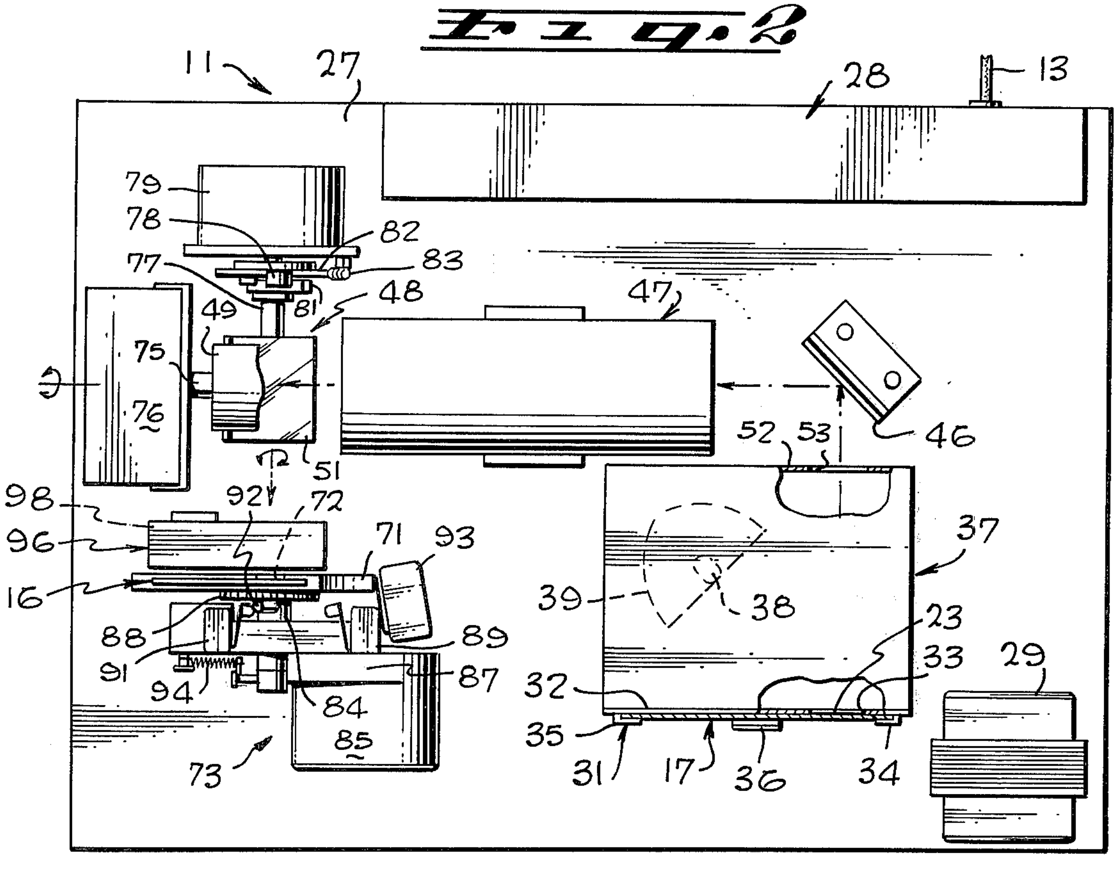
FIG. 2 is a sectional view taken in the direction 2—2 of FIG. 1 showing the major components of the comparator with certain of the structural features, the circuitry and electronic components omitted.
Figure 3:
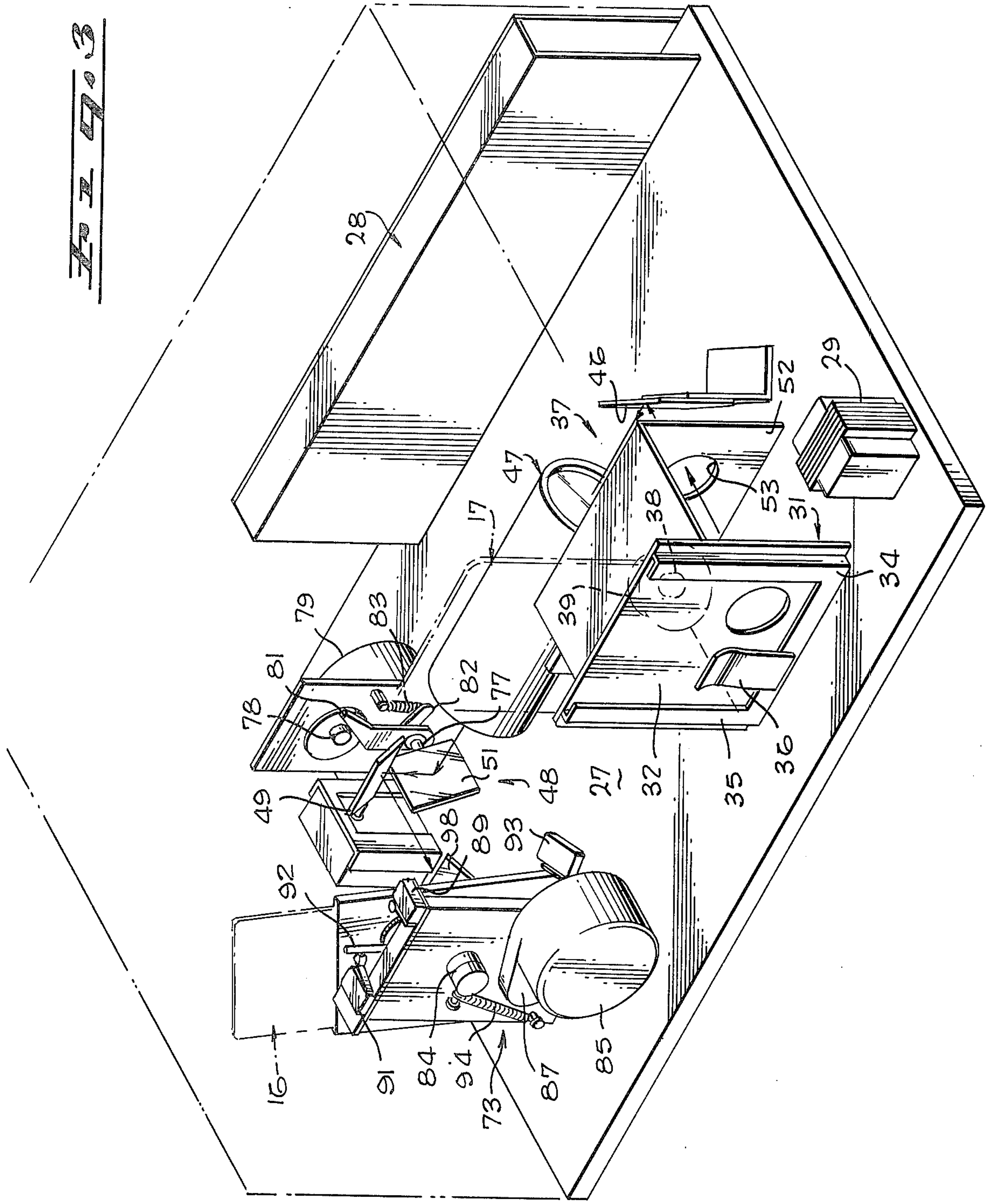
FIG. 3 is an enlarged perspective X-ray view of the principal components of the comparator of FIG. 1.
Figure 4:
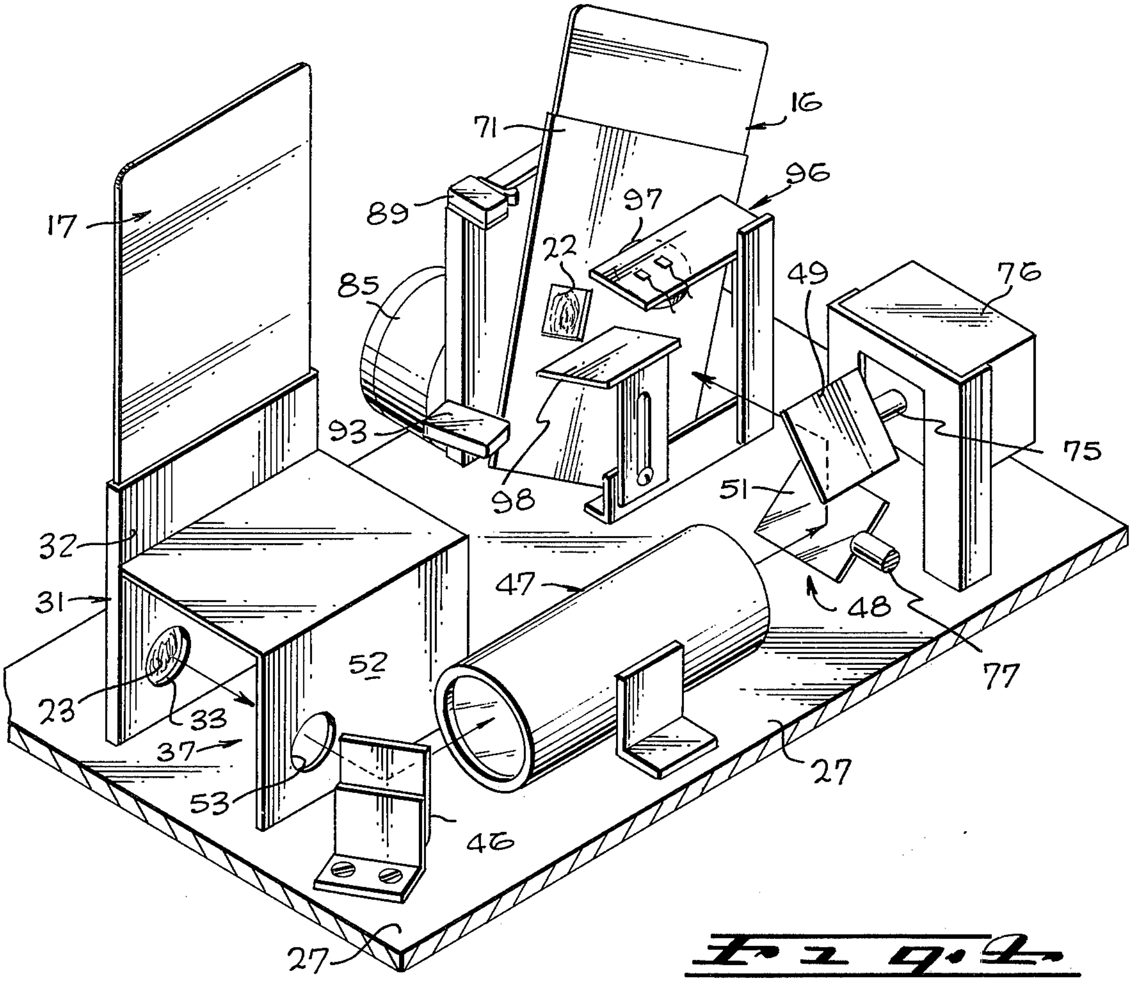
FIG. 4 is a fragmentary perspective view of the components shown in FIG. 3, as seen from the right, rear corner of the comparator of FIG. 3.

Referring now to FIGS. 2, 3, and 4, casing 12 is removeably mounted on a base 27 which supports the various components. A rack 28 is mounted on the base 27 to hold the principal electronic circuitry (not shown) which is preferably in the form of printed circuit boards with solid state components. A conventional power transformer 29 powers the various electrical and electro-mechanical components.

Holder 31 is mounted upright on base 27 below slot 15 to receive the check 17. The construction of holder 31 is a matter of choice, however, in the comparator illustrated here it includes an opaque face plate 32 having an opening 33 therein positioned to register with the print 23 on check 17. A pair of guides 34, 35 retain the edges of the check 17, and a leaf spring 36 holds check 17 flat against face plate 32. A spring-mounted plate (not shown) may be provided inside check guide 35 to compensate for variations in check widths and thereby assure registration of print 23 with the opening 33.

Numeral 37 designates the illumination subsystem of the comparator. The function of this subsystem is to provide a sufficient quantity of illumination on the surface of fingerprint 23 to allow its image to be projected onto the surface of fingerprint 22 on signature card 16 for signal processing.

The amount of illumination required is substantial, owing to the well-known inefficiencies inherent in any opaque projection system. The heat given off by a conventional tungsten filament lamp with sufficient output to satisfy this requirement would cause the paper check 17 to char or burn. The demands imposed by a reliable, safe cooling or heat dissipation system are incompatable with a comparator of the type sought to be provided. Accordingly, a special design is required for the illuminator.

The illumination subsystem 37 of the subject invention incorporates a high-intensity tungsten iodide lamp 38 and a high efficiency reflector which concentrates the energy from the lamp into the portion of print 23 exposed through opening 33. Preferably the reflector 39 has an eliptical low F-number reflective surface.

Reflector 39 is a dichroic filter of the type which reflects only the visible portion of the output of lamp 38 and dissipates the infrared portion of the lamp's output rearwardly and laterally away from the surface of check 17.

Theoretical considerations and experimentation demonstrate that varying the geometric shape, or the size, of the field of fingerprint 23 which is imaged on print 22 substantially influences the correlation signal output. Since the probability of occurrence of linear or geometric distortion in a small region of print 23 is much less than the probability of occurrence of similar distortion over the entire print 23, to minimize the problems associated with such distortion, the area of the image of print 23 actually scanned over print 22 should be as small as practicable. Analysis and experience both suggest that an area of approximately 0.8 square inch is large enough to contain a sufficient number of ridge characteristics to permit positive print identification, and at the same time, small enough to reduce the distortion-related difficulties to manageable proportions.

The openings 33, 53 which determine the shape of the image scanned on exemplar 22 are circular and about one-third inch in diameter. This shape appears to maximize the number of print characteristics included in the image field, while minimizing the probable linear and geometric distortion contained within that field. It will be understood, however, that other geometric configurations may be used with satisfactory results.

The optical subsystem of comparator 11 serves to project a portion of the fingerprint pattern of print 23 onto exemplar 22. Additionally, this subsystem eliminates stray light from the projected image and performs a measure of spatial filtering.

Essentially the optical subsystem comprises a fixed plane mirror 46 positioned to form an angle of 45° with the face of check 17, projection lens and spatial filtering system 47 positioned to receive the illuminated image of print 23 from mirror 46, and a scanning system 48, in this illustration including a pair of moveable plane mirrors 49, 51.

A mask 52 is positioned between face plate 32 and mirror 46 and is provided with an opening 53 therethrough which serves to refine the illuminated image of fingerprint 23 falling on mirror 46 and reduce the amount of undesired scattered light entering the optical subsystem.

Figures 5, 6, 7:
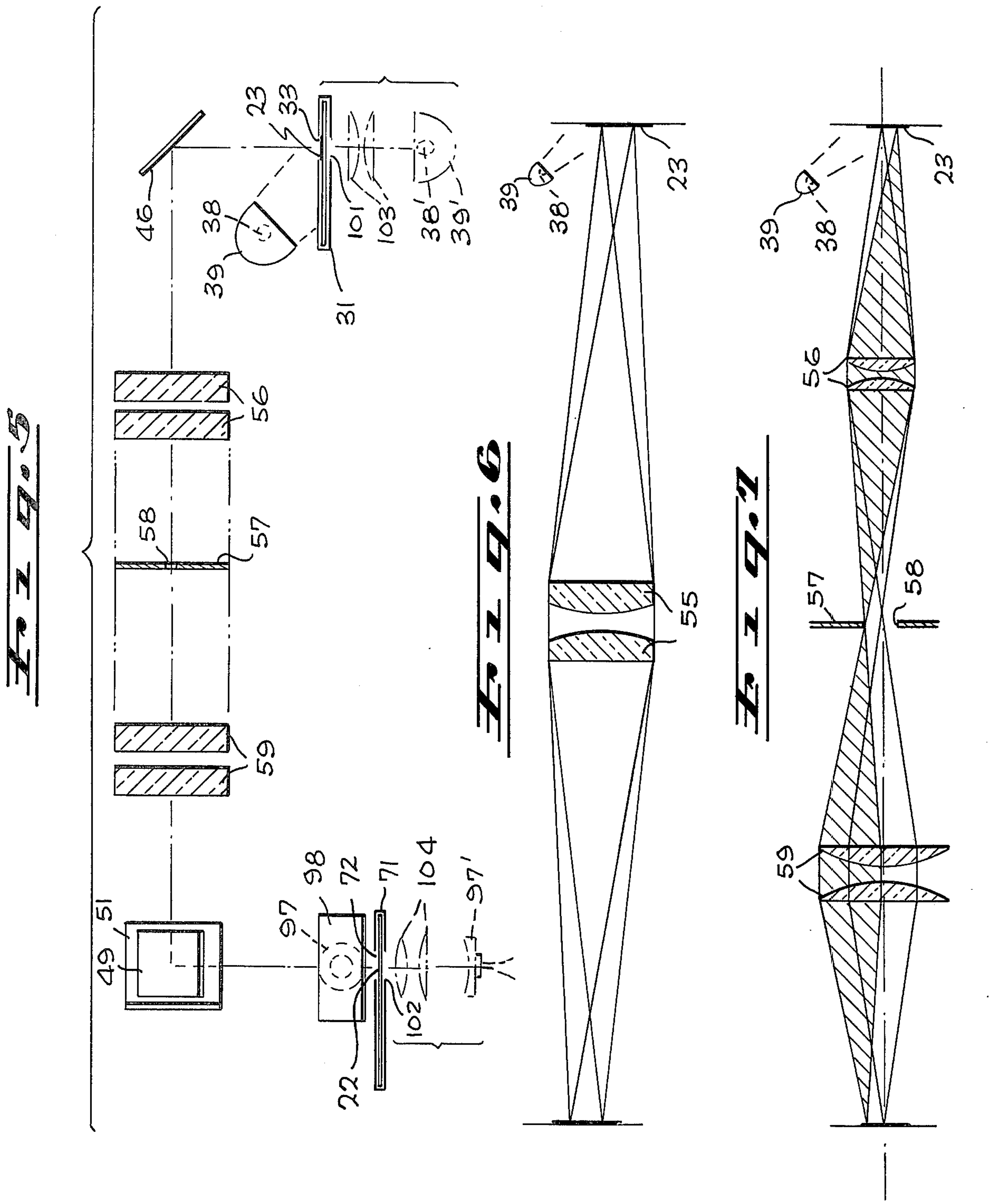
FIG. 5 is a diagrammatic top plan view of the optical system of the comparator of FIG. 1 with alternative image-projecting and radiance-sensing means shown in phantom.
FIG. 6 is a diagramatic view of a simple lens system.
FIG. 7 is a diagramatic view of a compound lens system incorporating an image limiting mask.

FIG. 6 illustrates a conventional relay lens assembly which could be used to project a portion of fingerprint pattern 23 for scanning over print 22. The specific design parameters for the lenses 55 of such an assembly are well known. To provide for stray light baffling, however, a configuration consisting of two relay lens assemblies in tandem may be utilized as shown in FIG. 7. The first relay lens assembly 56 projects a real image on a mask 57 containing an aperture 58. The mask intercepts undesired stray light, and only the desired portion of the image falls on the aperture 58. This aperture 58 containing the desired portion of the image, is re-imaged by the second relay lens assembly 59 for scanning across fingerprint 22.

If the projected image were uniformly illuminated as, for example, in the manner of a uniformly illuminated disk, then as it was scanned across fingerprint 22, it would generate strong false signals wherever its edge cut across some irregularity in the pattern of print 22. In mathematical terms, this illuminated disk would convolve with any feature in print 22 and cause relatively large signal variations.

Figure 11:
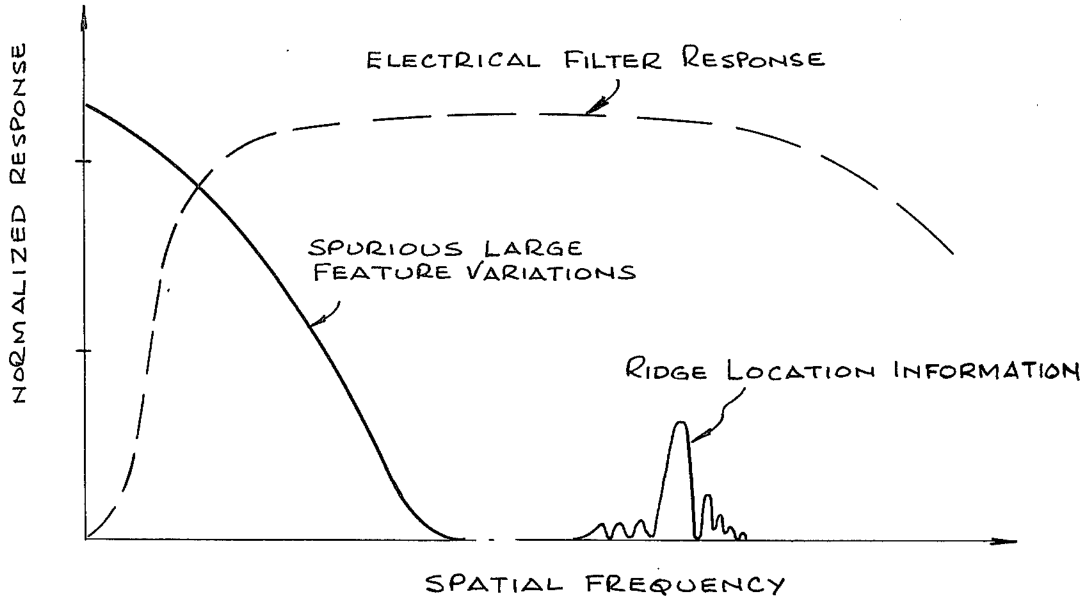
FIG. 11 is a graphic illustration of the locations in the spatial frequency domain of the relevant fingerprint information, irrelevant gross variations in the pattern, and the frequency response of the unapodized image as it would be sensed by a photodetector.

Such convolution can be analyzed by means of the wellknown Fourier transform relationships as multiplication in the Fourier domain. The Fourier transform of a disk is a first order Bessel function divided by its argument. FIG. 11 illustrates conceptually the locations in the spatial frequency domain of the relevent fingerprint information, irrelevant gross variations in the pattern, and the frequency response of the aperture. It may be seen that the apperture has significant response to both the spurious irrelevant gross variations and the relevant ridge structure signals.

Figure 12:
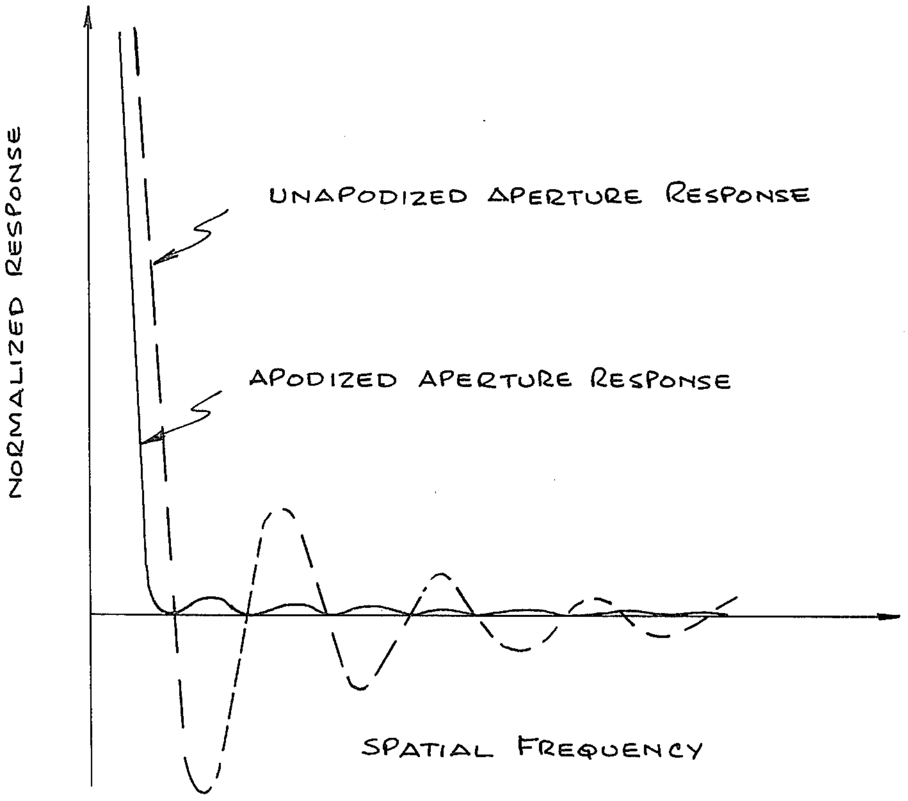
FIG. 12 is a graphic illustration of the reduction of unwanted response achieved by apodizing the image.

We have found that by apodizing the projected image so that rather than being uniform across the entire image, the illumination falls off more or less linearly from the center of the image the Fourier transform of the aperture becomes approximately squared, and most of its unwanted response is supressed as shown in FIG. 12. The remaining response can readily be filtered electronically.

Figure 10:
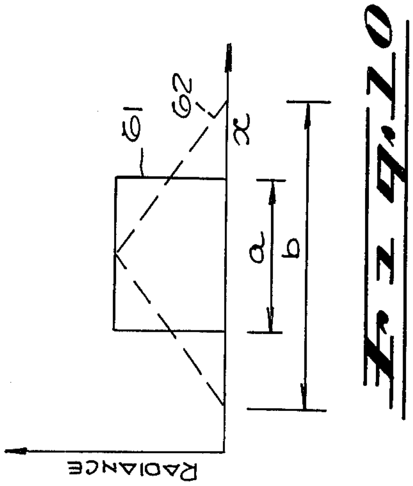
FIG. 10 is a graphic illustration of the effect of apodizing on the illuminated image.

FIG. 10 illustrates graphically the effect of such apodizing on the projected image. The curve 61 is more or less characteristic of the illumination associated with an unapodized image. The illumination is sharply delimited at its edges and covers a field having a diameter of *a*. Apodizing the same image produces an illumination curve 62 extending across an apparent diameter *b*.

Figure 8:
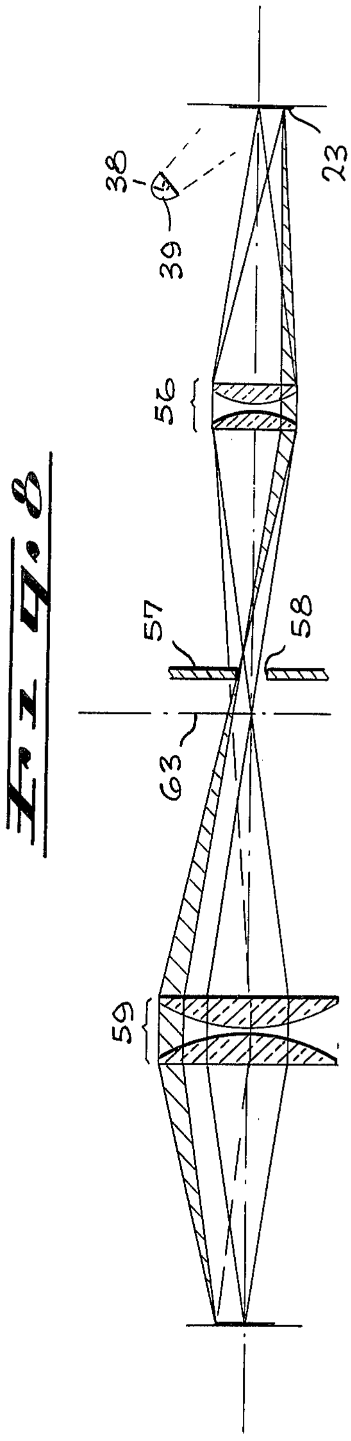
FIG. 8 is a diagramatic view of a compound lens system incorporating an image limiting mask positioned to apodize the transmitted image.

Several methods may be used to deliberately vignette the projected image to accomplish such apodizing. FIG. 8 illustrates one such method. Here, the mask 57 is displaced from the focal plane 63 of first relay lens assembly 56 so that the aperture 58 is introduced around the converging on-axis beam. By this means the cross-hatched portion of the image shown in FIG. 7 is deliberately vignetted so that only a part of this portion passes through the aperture 58 as shown in FIG. 8.

Figure 9:
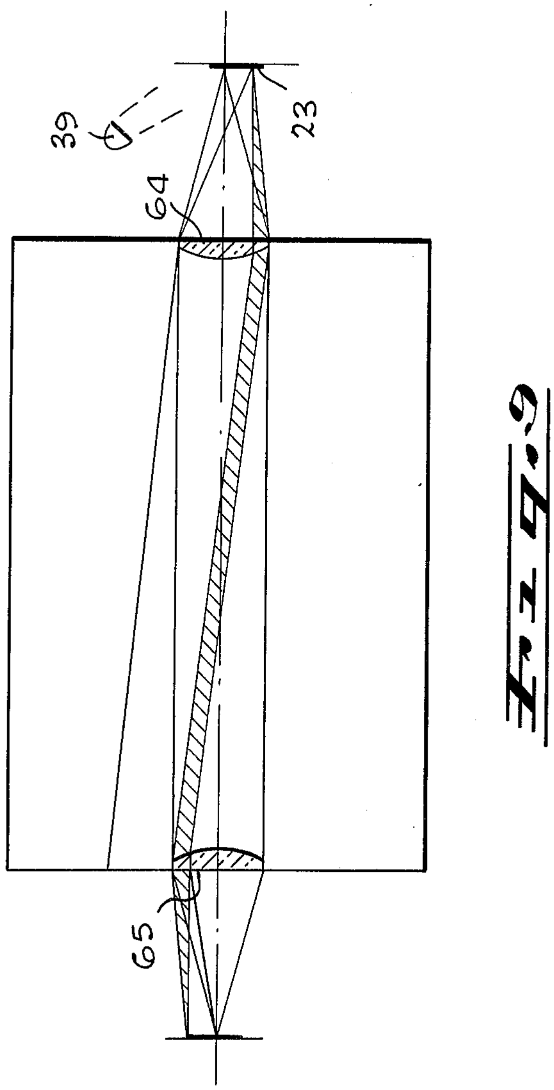
FIG. 9 is a diagramatic view illustrating an apodizing technique involving lens spacing.

FIG. 9 illustrates an alternative method of vignetting the projected image. In this method a pair of lenses 64, 65 are so arranged and spaced that only the cross-hatched portion of the off-axis image is refracted by lens 65. Obviously, other methods not here mentioned could be used to achieve the same result.

Referring again to FIGS. 2, 3 and 4, regardless of which system is used for spatial filtering, the re-focused apodized image of fingerprint 23 is scanned across exemplar fingerprint 22. The card 16 bearing print 22 is supported in a plane parallel with that of print 23 by a holder 71 the upper end of which extends upwardly through slot 14 in casing 12. An opening 72 in the face of holder 71 registers with the exemplar print 22. Holder 71 is sized to receive signature card 16 in a fairly tight slip-fit which, while permitting the card 16 to be inserted and removed easily, prevents lateral movement of card 16 within holder 71.

The purpose of the scanning function in the subject invention is twofold: the first and most apparent is to superimpose the image of print 23 on the face of exemplar print 22 and to move one with respect to the other in search for any identical features which may reside in the two print patterns. To allow for linear misalignment between the prints, the scanning pattern has to cover a finite area with a sufficient scan pattern line density to assure that the correlation location is not missed. To allow for rotational misalignment of the two prints 22, 23, this scan pattern must effectively be rotated in small angular increments and repeated until some predetermined range of angular displacement has been covered.

A second, and not at all apparent, scanning function is to generate a unique correlation signal which can be easily detected and readily enhanced by more or less conventional electronic signal processing techniques. The duration of this signal pulse is only the brief period when the two print patterns are momentarily juxtaposed during the scan program.

It will be understood that the sequence in which the scanning takes place is arbitrary. In the embodiment illustrated here, a vertical scan is performed at the higher speed. A slower horizontal scan is added in order to cover the scanned area in a raster such as that shown in FIG. 13. As seen in FIG. 14, when the raster frame of FIG. 13 has been completed, an incremental rotation through a small angle $\theta$ is implemented, and a new raster frame is scanned. This sequence continues until a predetermined degree of rotation has been achieved and the desired angular indexing tolerance covered.

Instead of being rotated incrementally, the scan pattern can be maintained in continuous rotation, as long as the rate of rotation is sufficiently slow with respect to the scanning rate to avoid missing the correlation point between scanning frames. Alternatively, the illuminating image could be rotated at relatively high speeds, and the rotational axis sequentially moved through a raster pattern similar to that shown in FIG. 13.

As depicted in FIGS. 2, 3 and 4, the scanning mechanism includes mirrors 49, 51, with their associated drive mechanisms, and the rotary drive mechanism 73 associated with card holder 71.

Mirror 49 is mounted to the output shaft 75 of a resonant electromechanical torque drive, such as a galvanometer 76, to oscillate rapidly. This oscillation may be at any convenient frequency, from a few tens to thousands of cycles per second, depending on the need for processing speed in the apparatus.

Mirror 51 is mounted to shaft 77. An eccentric cam 78 is driven by motor 79 and in turn drives follower arm 81, which is mounted on shaft 77. Return arm 82 is likewise mounted on shaft 77 and has its outer end connected to tension spring 83. This arrangement imparts a restricted reciprocating motion to mirror 51. The reciprocating motion of mirror 51 is at a frequency substantially lower than that of oscillating mirror 49.

Mirrors 49 and 51 are oriented so that mirror 51 is in the path of the image of fingerprint 23 emitted by lens assembly 47 and in turn projects this image onto the face of mirror 49. Mirror 49, in turn, is optically aligned with the opening 72 in card holder 71.

Figure 13:
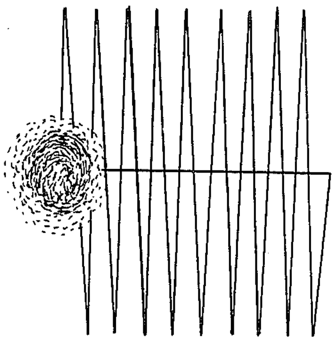
FIG. 13 is a graphic illustration of a typical scan raster pattern.
Figure 14:
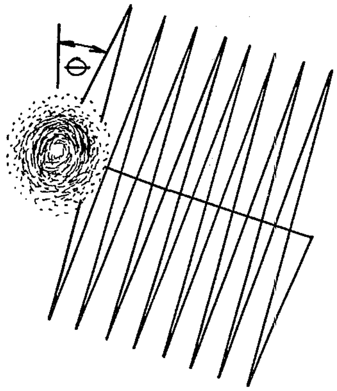
FIG. 14 is a graphic illustration of the raster pattern of FIG. 13, after it has been rotated.

It will be obvious from an examination of FIGS. 2, 3 and 4 that in this arrangement the reciprocating and oscillating motion of mirrors 51 and 49 superimposes the image of print 23 on the print 22 and causes the image to scan across the face of print 22 in a raster pattern such as that depicted by FIG. 13. It will also be apparent that the scanning function served by mirrors 49, 51 and their respective drive mechanisms may be accomplished through a variety of alternative means, any of which may be substituted for those shown here for illustrative purposes. In any event, the length and breadth of the scan raster, and the vertical and horizontal distances scanned with each sweep of the image across the face of print 22 relate to the expected misalignment between the two print locations. Typically the length and breadth of the raster would be of the order of an inch or less.

Either simultaneously with the vertical and horizontal scans, or sequentially at the end of each raster frame, the image of print 23 is effectively rotated with respect to print 22. This is most expeditiously performed in the preferred embodiment illustrated here by causing card holder 71 to rotate about an axis normal to the face of print 22 at its center.

As illustrated, card holder 71 is mounted for rotation on shaft 84 which projects rearwardly from the back side of card holder 71 at a point centered on opening 72. Electric motor 85 drives shaft 84 through drive train 87, which includes gears 88. A pair of microswitches 89, 91 are tripped by pin 92 mounted to shaft 84.

Holder 71 is in the position shown in FIGS. 2, 3 and 4 when card 16 is inserted. When the scanning cycle is initiated, motor 85 rotates the holder 71 in a series of timmed incremental moves in a clockwise direction as seen in FIG. 3. When pin 92 trips limit switch 89, the cycle has been completed and the drive system 73 is deactivated. Spring 94 attached to shaft 84 rotates the holder 71 in the opposite direction until it comes to rest against stop 93 which is fixed to base 27, and pin 92 trips microswitch 91, thereby indicating the end of the comparison cycle and deactivating the entire system.

Figure 15:
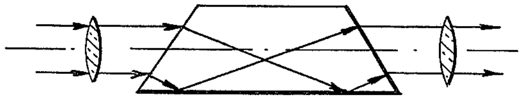
FIG. 15 is a schematic view of a Dove prism.
Figure 16:
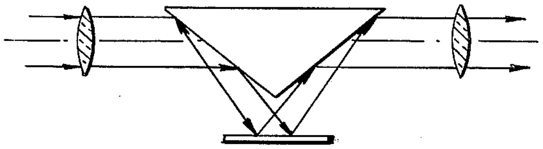
FIG. 16 is a schematic view of a K-mirror image rotator.

It will be noted that the relative rotation of the scan raster of projected image 23 about print 22 could be accomplished by alternative means, such as a Dove prism assembly as shown in FIG. 15 or a K-mirror assembly as shown in FIG. 16.

In any case, the rate of rotation has to be limited so that no point in the projected image moves more than one resolution element within the period of one scan raster frame. The amount of total angular rotation required relates to the expected angular misalignment between the two prints. This might typically by less than plus or minus 15°.

By way of example, in a typical scan program intended to locate potential correlation between two prints within an analysis period of four seconds, a vertical scan oscillation rate of 200 Hz., and a horizontal sweep of 2 Hz., resulting in 100 scan lines per frame, might be employed. Since the fingerprint line density is of the order of 50 lines per inch, with an overall frame width of 0.66 inch, the line density is quite adequate for assuring that the correlation point, if any, if not missed.

If simultaneously an angular rotation rate of two degrees per frame is imposed on one or other of the prints, since each frame is completed in 0.25 second, at a rotation rate of 8° per second a 32° angular scan is completed in the allotted 4 seconds. During this period the print is scanned by 16 successive raster frames. It will be understood that the foregoing figures are offered by way of example only, and that obvious tradeoffs exist between the scan rate and scan time, as well as scan angle and time.

A sensor assembly 96 is provided to sense the variations in the light energy reflected by or transmitted through fingerprint 22 as the illuminated image of fingerprint 23 is scanned over it, and to convert these variations into an analogous electrical signal.

In the embodiment of the detector illustrated in FIGS. 2, 3, and 4, wherein the fingerprints 22, 23 are printed on opaque paper, the sensor assembly 96 consists primarily of a photodetector 97 mounted in the proximity of the plane of fingerprint 22 in such a manner as to be exposed optimally to the light energy reflected from the plane of print 22.

The motion of the illuminated image of print 23 in the plane of print 22 causes a variation in the distance between the projected image and the photodetector. This variation in distance would, if uncorrected for, cause a variation in the radiance observed by the photodetector, in accordance with the well-known inverse square law. This in turn would cause a spurious modulation of the signal output from the detector.

To overcome this problem, a mirror 98 is mounted near the print 22 on the opposite side of opening 72 from the detector 97. This mirror 98 effectively causes detector 97 to "see" two moving images, the direct image, and a second, reflected image. As the direct image moves away from the photodetector 97, its reflected image in mirror 98 moves toward the photodetector 97, and vice versa. The net result of this arrangement is to cancel the effect of relative motion on the radiance sensed by the detector 97, and to eliminate the spurious signal modulations which might accompany it. The same result can be achieved by substituting one or more detectors, spaced around opening 72, in place of mirror 98.

The electrical output of the photodetector 97 is coupled to appropriate signal processing circuitry which filters out noise and unwanted signals and extracts the desired correlation signal. when and if it occurs.

FIG. 5 illustrates schematically the relationships among the illumination, optical processing, scanning and detecting subsystems of the embodiment heretofore described. Additionally, it illustrates in phantom the arrangement of the same subsystems as they might be employed in an identification system embodying the subject invention, wherein the prints 22, 23 are in the form of transparencies, rather than opaque. The modification is a fairly straightforward and relatively simple one.

In addition to the openings 33, 72 in the faces of holders 31 and 71, respectively, openings 101, 102, respectively, are provided in the rear faces of the two holders. Lamp 38' and reflector 39' are positioned behind the opening 101 in holder 31 and the intense visible light generated is directed through opening 101, print 23 and opening 33 by means of condenser lenses 103. The detector 97' is likewise positioned behind opening 102 in holder 71 and senses variations in the illumination passing through opening 72, transparent print 22 and opening 102 as it is focused by field lenses 104. Since detector 97' can be positioned coaxial with the light beam passing through print 22, mirror 98 is not needed in this configuration.

Figure 21:
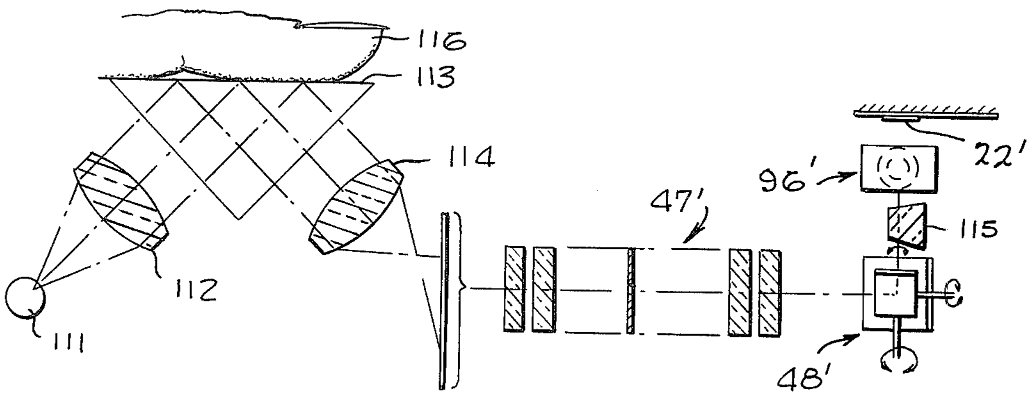
FIG. 21 is a composite diagramatic view illustrating an alternative embodiment of the subject invention employing a total-reflection prism to capture a "live" fingerprint and a Dove prism to rotate the projected image.

FIG. 21 illustrates an alternative embodiment of the subject invention, wherein a "live" print is utilized in place of opaque fingerprint 23 or a similar transparency.

Here, light from a conventional source 111 is condensed by lens 112 and directed through a totally reflective prism 113. The light emitted by prism 113 is focused by means of a field lens 114 and projected by conventional means through an optical projection and spatial processing assembly 47' similar to that illustrated in FIGS. 2, 3 and 4. The optically processed image is relayed by a scanning mirror assembly 48' similar to that of the previously described embodiment through a rotated Dove prism 115 and then onto exemplar print 22'. Sensor assembly 96' is positioned adjacent print 22' and functions in the manner previously described to produce an output signal in response to variations in radiance reflected by print 22'. The live print is produced in a well-known manner by placing the subject's finger 116 on the surface of prism 113 so that the fingerprint ridges which contact the surface cause a scattering of the internally reflected light impinging on them.

Figure 17:
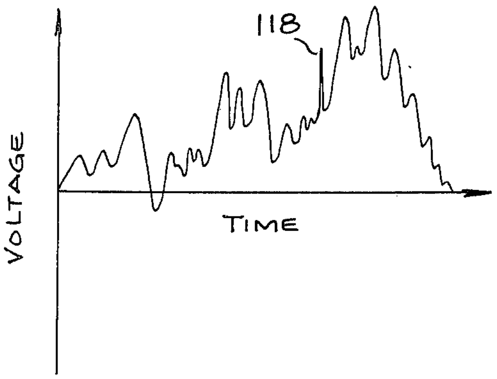
FIG. 17 is a graphic illustration of a typical sensor output signal generated by the scanning of the image and the print being scanned, before electrical signal processing.

In any of the embodiments of the subject invention, while the image of print 23 is being scanned across print 22, detector 97 sees some random variation in reflected radiance. A typical detector signal responsive to such variations is shown in FIG. 17. These random variations obtain for matching as well as non-matching prints. When the prints match, however, at the instant of juxtaposition of the image of print 23 with exemplar 22, a sharp spike or correlation pulse 118 occurs.

The measure of correlation is the ratio of the amplitude of pulse 118 to the root mean square amplitude of the random non-correlated signal. This is because the random variation signal amplitude is proportional to all of the factors of graphic quality and illumination that determine the correlation pulse height. Thus, the random signal is the normalizing factor.

Figure 18:
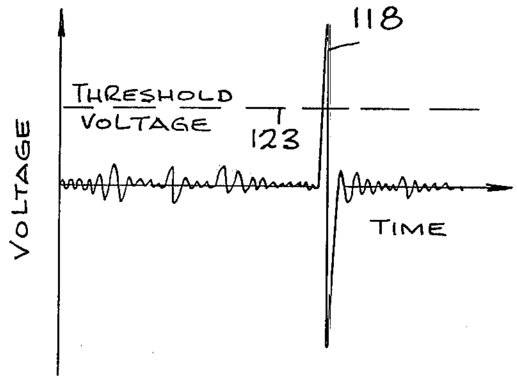
FIG. 18 is a graphic illustration of the signal of FIG. 17, after electrical signal processing.

The absolute values of both the high frequency correlation pulse amplitude and the low frequency random signal level can vary over orders of magnitude, but the ratio remains relatively constant. Additionally, spurious signals can occur, caused by various factors in the scanning process, which can exceed or mask the correlation pulse 118. In order to suppress such spurious signals and scanning noise and obtain an accurate ratio measurement the subject invention employs electrical signal processing in addition to the spatial filtering previously discussed. This electrical processing serves to maximize the overall signal to noise ratio to enable the system to detect correlation in prints of poor quality and to enhance accuracy and repeatability. FIG. 18 is typical of the signal shown in FIG. 17 as it might appear after such processing.

Figure 19:
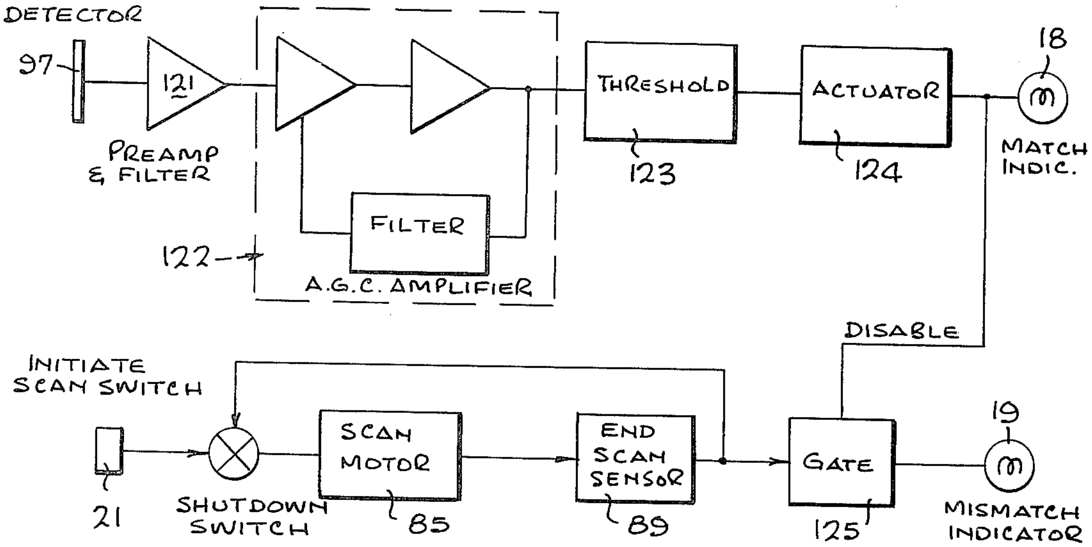
FIG. 19 is a block diagram illustrating the electronic signal processing employed by the comparator of FIG. 1.

As illustrated in simplified form in FIG. 19, the first stage of the electrical signal processing circuitry employs a conventional low-noise preamplifier and high-pass filter 121 downstream from the detector 97 to enhance the desired signal and suppress undesired low-frequency gross feature signals and background noise. The signal of FIG. 18 is produced by this optimum filtering stage.

Another key feature of the signal processing employed in the subject invention, is the method of obtaining the ratio of the peak correlation signal 118 to the normalized random signals.

This method is to use a tight, fast automatic gain control (AGC) amplifier 122. The AGC 122 locks on the random signal level and maintains the output level at a fixed amplitude, regardless of the input signal level seen by the detector 97, and regardless of any steady-state illumination that may fall on the detector 97 from any stray light sources. Its response is made fast enough to follow the signal level variations as different parts of the pattern are scanned, but not fast enough to to respond to the correlation pulse 118 when it occurs.

With the random, non-correlated signal level held constant, regardless of graphic quality or illumination, a threshold 123 is set at some level well above the random output level. Typically the threshold is at a level 5 or 6 times that of the random output level. When the fingerprints match, the correlation peak 118 is generally from 8 to 15 times the random level. When they do not match, the maximum correlation peaks observed are seldom more than 5 times the random signal level.

Occasionally a pair of non-matching prints are found which are sufficiently similar that the illuminated sample image produces a high correlation peak at some location on the exemplar print, however, the statistical probability of this occurrance is well within acceptable limits for the uses to which the comparator is normally applied. Even this rare occurrance can be effectively met by raising the threshold level.

An actuator 124, in the form of a relay, silicon controlled rectifier, or the like is made responsive to a correlation pulse which exceeds the threshold and actuates an indicator, such as green light to announce a positive identification.

The switch 21 initiates the scan command and activates the scanning mechanism, including motor 85. At the end of the scan program microswitch 91 serves as an end-scan sensor and deactivates the system. If no positive correlation has been sensed by this time a disabling signal is transmitted through gate 125 to energize the red light 19 signifying a mismatch between the specimen print 23 and exemplar 22.

Figure 20:
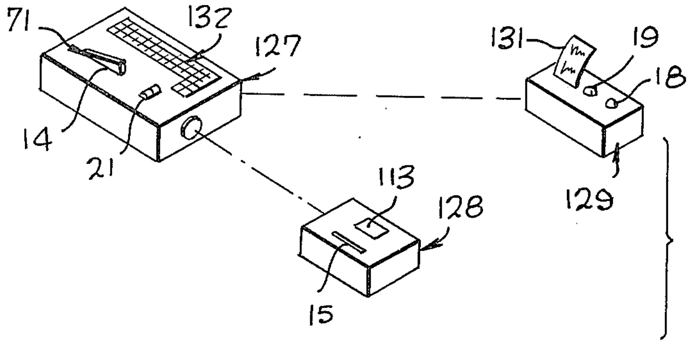
FIG. 20 is a composite fanciful perspective view of several alternative modular components embodying the subject invention.

Because of its basic design and function the comparator of the subject invention readily lends itself to a variety of specialized applications. FIG. 20 illustrates several of these.

By incorporating the scanning and sensing subsystems in a modular unit 127 various input means in the form of module 128 may be employed. Thus either the fixed print holder of FIGS. 2, 3 and 4, or the live print projection system of FIG. 20 may be used interchangably.

Similarly, in place of the simple light indicators 18, 19 output module 129, giving a permanent printout 131, may be added to the scanning module 127, which may, in turn, be provided with input keys 132 for use in registering financial or credit transactions, as, for example, in a restaurant, store, or other commercial establishment.

It will be appreciated from the foregoing necessarily limited description of but a few of the preferred embodiments of the subject invention that both the specific construction and the various uses of this device may be varied within the limitations of the invention as it is defined by the following claims.

We claim:

1. An apparatus for rapid automatic comparison of two patterns, each located and oriented randomly within a bounded plane area, comprising:

a source of intense incoherent light illuminating a first one of said patterns;

optical projection means interposed between said patterns optically superimposing the image of said first pattern on the second of said patterns, said optical projection means including spaced first and second coaxial lenses so arranged that the periphery of the image of said first pattern projected by said first lens into said second lens is vignetted by said second lens;

scanning means positioned between said optical projection means and said second pattern causing said image to traverse said second pattern in a repeating scan raster;

rotation means effectively rotating said scan raster with respect to said second pattern about an axis passing through said second pattern and normal to the plane thereof;

sensing means responsive to the radiance produced by the interaction of said image with said second pattern positioned adjacent said second pattern, said sensing means emitting an electrical signal whose amplitude and frequency are representative of said radiance;

electrical signal processing means connected with said sensing means electrically comparing the amplitude of said signal with a preestablished correlation amplitude threshold; and indicator means responsive to said signal processing means and actuated thereby when said signal exceeds said threshold to indicate the matching of said patterns.

2. An apparatus for rapid automatic comparison of two patterns, each located and oriented randomly within a bounded plane area, comprising:

a source of intense incoherent light illuminating a first one of said patterns;

optical projection means, including spaced coaxial first and second lenses, interposed between said patterns optically superimposing the image of said first pattern on the second of said patterns;

image apodizing means associated with said optical projection means for spatial filtering of said image, including an opaque mask positioned intermediate said lenses and having an aperture therethrough lying on the optical axis of said lenses inside the focus of said first lens;

scanning means positioned between said optical projection means and said second pattern causing said image to traverse said second pattern in a repeating scan raster;

rotation means effectively rotationg said scan raster with respect to said second pattern about an axis passing through said second pattern and normal to the plane thereof;

sensing means responsive to the radiance produced by the interaction of said image with said second pattern positioned adjacent said second pattern, said sensing means emitting an electrical signal whose amplitude and frequency are representative of said radiance;

electrical signal processing means connected with said sensing means electrically comparing the amplitude of said signal with a preestablished correlation amplitude threshold; and indicator means responsive to said signal processing means and actuated thereby when said signal exceeds said threshold to indicate the matching of said patterns.

3. An apparatus for rapid automatic comparison of two patterns, each located and oriented randomly within a bounded plan area, comprising:

a source of intense incoherent light illuminating a first one of said patterns;

optical projection means interposed between said patterns optically superimposing the image of said first pattern on the second of said patterns;

image apodizing means associated with said optical projection means for spatial filtering of said image;

scanning means positioned between said optical projection means and said second pattern causing said image to traverse said second pattern in a repeating scan raster, said scanning means comprising a pair of reflectors positioned in the optical path of the image of said first pattern projected from said optical projection means, said reflectors being mounted for oscillating rotation about mutually perpendicular axes of rotation, and a pair drivers driving said reflectors in oscillating rotary motion about said axes, thereby imparting scanning motion to said image;

rotation means effectively rotating said scan raster with respect to said second pattern about an axis passing through said second pattern and normal to the plane thereof;

sensing means responsive to the radiance produced by the interaction of said image with said second pattern positioned adjacent said second pattern, said sensing means emitting an electrical signal whose amplitude and frequency are representative of said radiance;

electrical signal processing means connected with said sensing means electrically comparing the amplitude of said signal with a preestablished correlation amplitude threshold; and indicator means responsive to said signal processing means and actuated thereby when said signal exceeds said threshold to indicate the matching of said patterns.

4. The apparatus defined by claim 3 comprising:

holding means for supporting said first and second patterns;

means for rotating one of said holding means about an axis passing through its associated pattern and normal to the plane thereof, thereby causing said scan raster to rotate with respect to said second pattern.

5. The apparatus defined by claim 3 comprising optical means for rotating said scan raster with respect to said second pattern.

6. The apparatus defined by claim 5 comprising:

a Dove prism positioned in the optical path of the image of said first pattern; and driving means rotating said Dove prism about its principal optical axis.

7. The apparatus defined by claim 5 comprising:

a K-mirror assembly positioned in the optical path of the image of said first pattern; and driving means rotating said K-mirror assembly about its principal optical axis.

8. The apparatus defined by claim 3 comprising:

a photodetector positioned adjacent one edge of said second pattern to receive said radiance directly from said second pattern; and a reflector positioned adjacent the edge of said second pattern remote from said photodetector to reflect radiance from said second pattern into said photodetector.

9. The apparatus defined by claim 8 wherein said electrical signal processing means comprise in series:

a preamplifier;

a high-pass filter;

an automatic gain control amplifier and a threshold.

10. The apparatus defined by claim 9 wherein said threshold is adjustable.

11. The apparatus defined by claim 9 wherein:

said holding means for said first pattern is fixed;

said holding means for said second pattern is mounted for rotation about an axis passing through said second pattern and normal to the plane thereof;

driving means rotate said holding means for said second pattern about said last mentioned axis.

12. The apparatus defined by claim 9 wherein said rotation means causes said scan raster to rotate in descrete increments at the completion of each successive scan raster frame.

13. The apparatus defined by claim 9 wherein said rotation means causes said scan raster to rotate continuously during each successive scan raster frame.

14. An apparatus for rapid automatic comparison of two patterns, each located and oriented randomly within a bounded plane area, comprising:

an incandescent lamp illuminating a first of said patterns with incoherent light;

an optical projector projecting the image of said first pattern along an optical path;

an image apodizer positioned in said optical path to vignette said image;

a holder supporting said second pattern for rotation about an axis passing through said second pattern and normal to the plane thereof;

a pair of oscillating reflectors positioned in said optical path and cooperating to scan said apodized image across said second pattern in a repeating scan raster;

a photodetector positioned to sense the incoherent radiance produced by the interaction of said apodized image and said second pattern and to emit an electrical signal in response to said radiance;

an electrical signal processing circuit connected to said photodetector and responsive thereto, said circuit including, in series, a preamplifier, a high-pass filter, and automatic gain control amplifier, and a threshold; and an indicator actuated by the output of said circuit when said output exceeds a preestablished threshold amplitude, thereby indicating the matching of said patterns.

15. An apparatus for rapid automatic comparison of two patterns, each located and oriented randomly within a bounded plane area, comprising:

a base;

a first holder fixed to said base for receiving and releasably holding a first one of said patterns;

a second holder spaced from said first holder for receiving and releasably holding the second of said patterns;

a high-intensity incandescent lamp secured to said base adjacent said first holder;

an ellipsoidal dichroic reflector of very low F-number secured to said base and directing high-intensity incoherent illumination from said lamp onto said first pattern;

a first opaque mask secured to said base adjacent said first pattern and having an opening therethrough limiting the field of the image of said first pattern visible through said mask;

an optical projection assembly secured to said base intermediate said patterns, said assembly including first and second spaced lenses and a second opaque mask having an image apodizing aperture therethrough positioned intermediate said lenses with said aperture on the optical axis of said lenses and spaced from the focal point of said first lens;

a first reflector secured to said base and positioned to direct the image of said first pattern visible through said first mask into said first lens;

a second reflector positioned in the optical path of the image emitted by said projector and mounted to said base for limited oscillatory rotation about an axis perpendicular to said path;

a third reflector positioned adjacent said second reflector and in the optical path of the image reflected thereby, said third reflector being mounted to said base for limited oscillatory rotation about an axis parallel with the optical path of the image emitted by said projector, said second and third reflectors being so positioned with respect to said second holder to superimpose the image reflected by said second reflector onto said second pattern;

a pair of drivers mounted to said base and effectively connected to said second and third reflectors to drive said reflectors, thereby scanning the image of said first pattern over the face of said second pattern in a repeating scan raster;

a mount secured to said base and supporting said second holder for limited rotation thereof about an axis passing through said second pattern and normal thereto;

a motor secured to said base and effectively connected to drive said second holder, thereby causing said second pattern to rotate with respect to said scan raster;

a photodetector mounted to said base adjacent the edge of said second pattern to receive and respond to incoherent radiance produced by the interaction of the illuminated image of said first pattern with said second pattern;

a fourth reflector mounted to said base and positioned adjacent the edge of said second pattern remote from said photodetector to reflect illumination from said second pattern into said photodetector;

an electrical signal processing circuit connected to the output of said photodetector, said circuit including a pre-amplifier, a high-pass filter, an automatic gain control amplifier and a threshold; and an indicator connected to said signal processing circuit and actuated thereby, when the output of said automatic gain control amplifier excees a preestablished correlation amplitude threshold, to indicate the matching of said patterns.

* * * * *